United States Patent
Drogo de Iacovo et al.

(10) Patent No.: US 7,991,908 B2
(45) Date of Patent: Aug. 2, 2011

(54) MEDIA TRANSCODING IN MULTIMEDIA DELIVERY SERVICES

(75) Inventors: Rosario Drogo de Iacovo, Turin (IT); Roberto De Bonis, Turin (IT); Pierfranco Rodi, Turin (IT)

(73) Assignee: Telecom Italia S.p.A., Milan (IT)

( * ) Notice: Subject to any disclaimer, the term of this patent is extended or adjusted under 35 U.S.C. 154(b) by 264 days.

(21) Appl. No.: 11/793,804

(22) PCT Filed: Dec. 24, 2004

(86) PCT No.: PCT/EP2004/053707
§ 371 (c)(1),
(2), (4) Date: Aug. 14, 2007

(87) PCT Pub. No.: WO2006/066632
PCT Pub. Date: Jun. 29, 2006

(65) Prior Publication Data
US 2008/0147864 A1    Jun. 19, 2008

(51) Int. Cl.
*G06F 15/16* (2006.01)

(52) U.S. Cl. ....................................... 709/232

(58) Field of Classification Search ................. 709/217, 709/219, 232, 238
See application file for complete search history.

(56) References Cited

U.S. PATENT DOCUMENTS

| | | | |
|---|---|---|---|
| 6,560,282 B2 * | 5/2003 | Tahara et al. | 375/240.02 |
| 6,563,517 B1 | 5/2003 | Bhagwat et al. | |
| 6,970,602 B1 * | 11/2005 | Smith et al. | 382/232 |
| 7,155,475 B2 * | 12/2006 | Agnoli et al. | 709/201 |
| 7,453,937 B2 * | 11/2008 | Henocq et al. | 375/240.03 |
| 2001/0047517 A1 | 11/2001 | Christopoulos et al. | |
| 2003/0227977 A1 | 12/2003 | Henocq | |
| 2005/0021726 A1 * | 1/2005 | Denoual | 709/223 |

FOREIGN PATENT DOCUMENTS

| | | |
|---|---|---|
| WO | WO 02/056563 A2 | 7/2002 |
| WO | WO 02/082755 A1 | 10/2002 |

OTHER PUBLICATIONS

Mohan, R. et al., "Adapting Multimedia Internet Content for Universal Access," IEEE Transactions On Multimedia, vol. 1, No. 1, pp. 104-114, (Mar. 1999).

* cited by examiner

Primary Examiner — Kenny S Lin
Assistant Examiner — Scott M Sciacca
(74) Attorney, Agent, or Firm — Finnegan, Henderson, Farabow, Garrett & Dunner, L.L.P.

(57) ABSTRACT

A method for managing the delivery of multimedia contents to users' communications terminals over a communications network includes transcoding the multimedia contents to be delivered. The transcoding includes: determining a transcoding method based on historical information of previous transcoding operations; performing a transcoding of the multimedia contents to be delivered according to the determined transcoding method to obtain transcoded multimedia contents to be delivered, and updating the historical information according to the performed transcoding of the multimedia contents to be delivered.

24 Claims, 4 Drawing Sheets

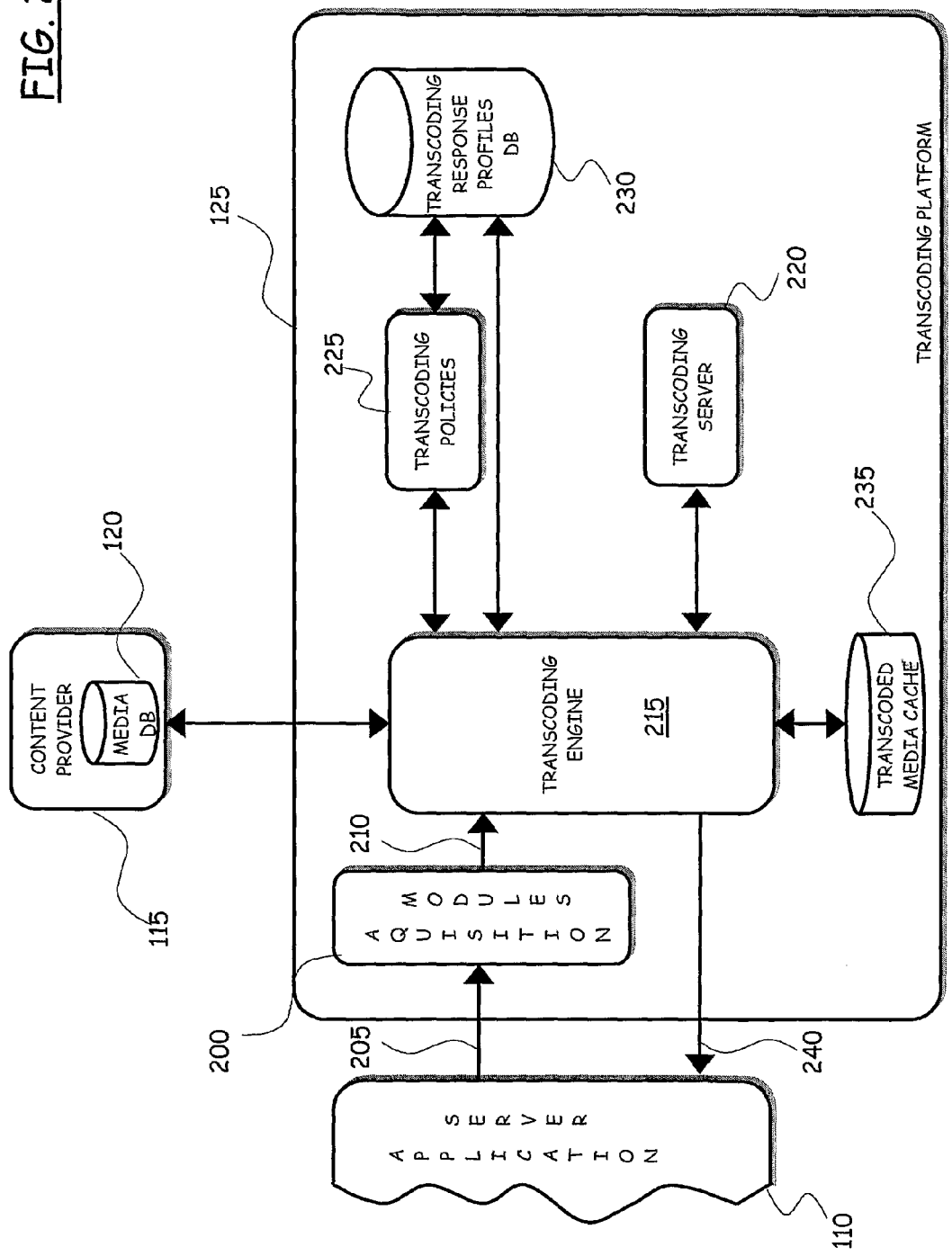

MEDIA TRANSCODING IN MULTIMEDIA DELIVERY SERVICES

CROSS REFERENCE TO RELATED APPLICATION

This application is a national phase application based on PCT/EP2004/053707, filed Dec. 24, 2004.

FIELD OF THE INVENTION

The present invention generally relates to the field of telecommunications, and particularly to the delivery of multimedia services.

BACKGROUND OF THE INVENTION

By multimedia service delivery there is meant the delivery of multimedia contents including one or more of audio and/or images and/or video and/or text An example of multimedia contents delivery is the Multimedia Messaging Service (MMS) implemented in mobile telephony networks.

In the field of multimedia service delivery, it is known to perform a conversion ("transcoding") of the multimedia contents from an original format to a transcoded format more suitable to the characteristics of, e.g., the user's communications terminal, and/or the communications link, and/or of the service class, and/or user's preferences.

The implementation of multimedia contents transcoding is motivated by several reasons, depending for example on the service and network context. For example, considering wireless multimedia delivery services, the transcoding can be made necessary by the variety of existing mobile communications terminals, thus by the differences in performance (different processing power, different I/O devices, and the like), and in the limited radio resources available. Thus, it is desirable that the information reaching the mobile communications terminal is already adapted to the terminal's characteristics, so as to reduce as much as possible the communications' bandwidth and the terminal's processing power.

The multimedia contents transcoding is based on transcoding policies that may in principle be objective policies (e.g. policies which can be described with a closed form mathematical equation), derived for example from the rate-distortion theory of C. E. Shannon, as described for example in R. Mohan et al., "Adapting Multimedia Internet Content for Universal Access", IEEE Trans. On Multimedia, March 1999, pp. 104-114.

However, deriving a mathematical solution to the problem following such an approach is a rather complex task, so more heuristic approaches have been proposed.

For example, in U.S. Pat. No. 6,563,517 a method for dynamically adjusting transcoding parameters is described, wherein a policy module queries an image size predictor to estimate the size of an output image, and queries a network bandwidth analyzer to estimate the image transmission time to the client. Based on the estimates, the transcoding proxy decides whether or not to transcode the image.

In WO 02/056563 an information adaptation service selects multimedia objects stored in a multimedia database, and a transcoder/scalability service converts, recodes and/or scales the multimedia objects retrieved. The information adaptation service and the transcoder scalability service rely on a set of user preferences and a set of terminal and/or network capabilities (e.g., available bandwidth, bit error rate, display size, resolution, processing power, storage capacity).

US 2003/0227977 concerns a method for selecting a transcoding method from a set of transcoding methods. Weight factors, dependent of the data to be transcoded, are attributed to the transcoding methods; a mean value of at least one characteristic representative of each transcoding method is weighted by applying the weigh factors. The transcoding method is selected as a function of the weighted mean values.

SUMMARY OF THE INVENTION

The Applicant has observed that the transcoding policies adopted in U.S. Pat. No. 6,563,517 are essentially static, in the sense defined hereinafter.

Let $R(Ui,t_x,D,I)$ denote a transcoding request received by the transcoding platform, where Ui identifies the user to which the multimedia contents are to be delivered, $t_x$ is the time at which the request is received, D identifies the data to be transcoded, and I identifies input parameters that define constraints for the transcoding operation. In reply to the request R, the transcoding platform provides a transcoding platform output O representing the transcoded data.

If, at a different, successive time $t_y$, the transcoding platform receives a request $R'(Ui,t_y,D,I)$ with Ui, D and I identical to those of the request $R(Ui,t_x,D,I)$, the transcoding policies implemented by the transcoding platform may be defined as "static" if the transcoding platform output O' coincides with the transcoding platform output O.

On the contrary, the transcoding policies are "dynamic" if O' (i.e., the transcoded data) is different from O.

In U.S. Pat. No. 6,563,517, the transcoding policies are based on the estimates of the available bandwidth, on the content and type of image and on the user's preferences; estimation modules for the available bandwidth and the size of transcoded file provide the inputs to the transcoding platform; albeit these estimation modules are updated on the basis of statistics, the transcoding policies are essentially static.

The Applicant has observed that a problem with static transcoding policies is that they are not capable of tracking changes in the quality of service perceived by the users, changes that can be due to changes in the population of users of a generic service (new users subscribe to the service, old users unsubscribe), changes in the users' habits that impact the users' preferences, changes in the capabilities of the users' communications terminals, offering of new services.

WO 02/056563 is silent about how the information adaptation service and the transcoding scalability service combine the user preferences, the network capabilities and the terminal capabilities for optimizing the transcoding operation.

Concerning US 2003/0227977, the transcoding policies that can be desumed from that document are nevertheless static, because the quality criterion ("PSNR") adopted to choose the transcoding method is not capable of capturing changes in the quality of service perceived by the users.

The Applicant has found that better results in terms, for example, of quality of service perceived by the users can be achieved by adopting adaptive transcoding policies, particularly transcoding policies that are based on statistical information, indicative of the past history of the transcoding platform, i.e., information on the past transcoding operations performed by the transcoding platform.

Essentially, statistical information about the transcoded multimedia contents generated in the past by the transcoding platform is kept, arranged for example in one or more databases. This information, that is kept constantly updated, is exploited to determine, from time to time, the best transcoding policy to adopt for servicing a generic transcoding request; this may allow to achieve a high quality of the service perceived by the users, taking into account the constraints deriving for example from the characteristics of the user terminal the network link, etc. In other words, the past history of the transcoding platform (reduced to statistics) is exploited to determine the transcoding policy to adopt for servicing a current transcoding request.

According to an aspect of the present invention, a method for managing the delivery of multimedia contents to user's communications terminals over a communications network, is provided.

Briefly, the method for managing the delivery of multimedia contents to users' communications terminals over a communications network, comprises transcoding the multimedia contents to be delivered. Said transcoding includes:

determining a transcoding method based on historical information of previous transcoding operations;

performing a transcoding of the multimedia contents to be delivered according to the determined transcoding method to obtain transcoded multimedia contents to be delivered, and updating the historical information according to the performed transcoding of the multimedia contents to be delivered.

For the purposes of the present invention, by multimedia service delivery there is intended the delivery of multimedia contents including one or more among audio content, and/or images and/or video and/or text and the like.

Another aspect of the invention relates to a transcoding platform for transcoding multimedia contents to be delivered to users' communications terminals over a communications network.

Summarizing, the transcoding platform, adapted to transcode multimedia contents to be delivered to users' communications terminals over a communications network, comprises:

a database adapted to store historical data indicative of previous transcoding operations performed by the transcoding platform;

a transcoding method determination module adapted to determine a transcoding method to be applied for transcoding the multimedia contents to be delivered based on said historical data;

a transcoder module adapted to transcode the multimedia contents to be delivered based on the determined transcoding method, so as to obtain transcoded multimedia contents to be delivered; and a historical data updating module adapted to update said historical data in said database according to the transcoding.

Still further aspects of the invention concerns the implementation of the transcoding method in the form of a web service, and a computer program and computer program product adapted to run on a data processing apparatus and to implement, when executed, the method according to the first aspect of the invention.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein:

FIG. 2 is a schematic block diagram of a transcoding platform according to an embodiment of the present invention;

DETAILED DESCRIPTION OF THE PREFERRED EMBODIMENT(S) OF THE INVENTION

Figure 1A:
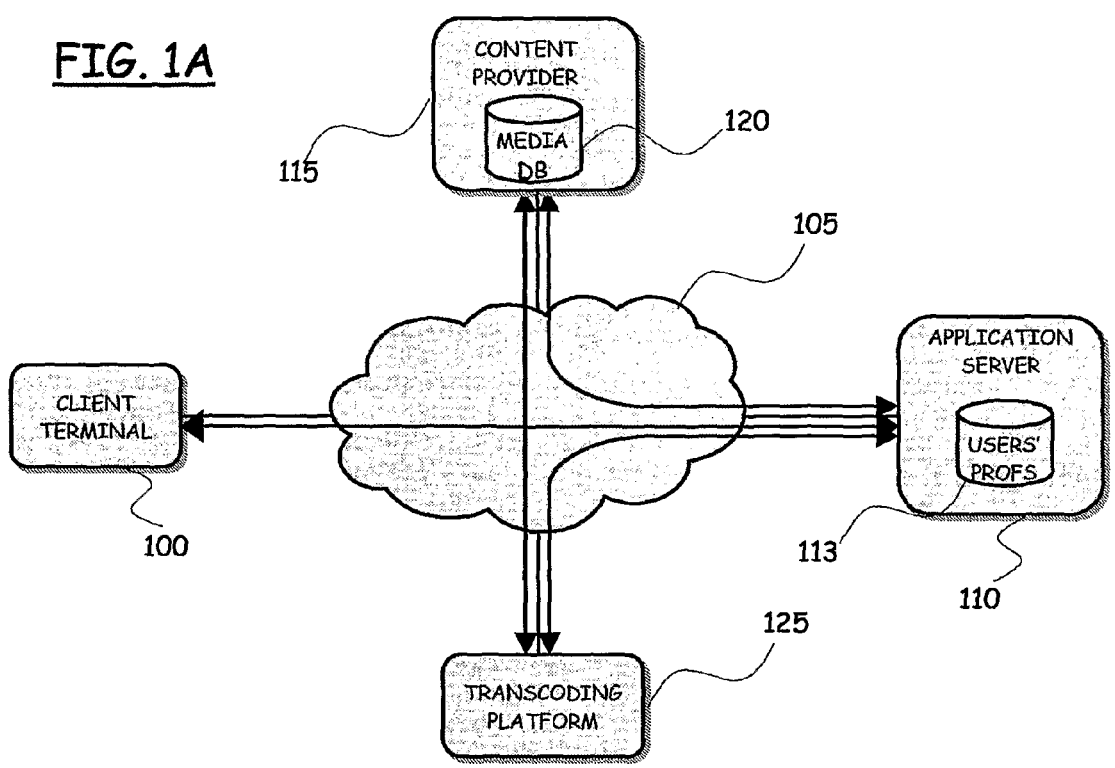
FIG. 1A schematically shows an exemplary scenario in which the present invention is applicable.

Referring to the drawings, in FIG. 1A there is schematically shown a first possible scenario wherein the present invention can be applicable.

A user's communications terminal 100 communicates, over a generic data communications network 105, with an application server 110, which for the purposes of the present description is a generic entity providing services of multimedia contents delivery to users' communication terminals (in the drawing the user's communication terminal 100 is labeled "client terminal" because it acts as a client of the application server 110).

The communications terminal 100, the data communications network 105 and the application server 110 can be of the most disparate type. For example, the communications terminal 100 may be a wired or a wireless communications terminal, such as a personal computer, a workstation, a portable computer with a wireless gateway to a packet-switched data communications network, such as a WIFI gateway or a GPRS modem, or a mobile communications terminal such as a cellular phone; the data communications network 105 may include a wired and/or a wireless communications network, such as the Internet, an intranet (e.g., a LAN, possibly wireless, a WAN, a MAN), a mobile telephony networks such as a GSM plus GPRSIEDGE or UMTS network; the application server 110 may for example be a server connected to the Internet, or to an intranet, for example a MMS (Multimedia Messaging System) center of a mobile telephony network.

The specific nature of the communications terminal 100, of the data communications network 105 and of the application server 110, nor the specific way the communications terminal 105 and the application server 110 are connected to the data communications network 105 are not critical nor limitative to the present invention.

The application server 110 further communicates, over the data communications network 105, with a multimedia contents provider 115, making available to the application server 110 multimedia contents (e.g., audio, images, video, text and the like) to be delivered to users; in particular, the multimedia contents may be stored in a multimedia contents database 120.

It is observed that the application server 110 may in principle communicate with more than one, e.g., two or more multimedia contents providers.

In order to satisfy users' requests for multimedia contents, the application server 110 needs to adapt the requested multimedia contents to be delivered to the different users to a set of parameters which may be either explicit or implicit in the user's request. Such parameters may include the specific characteristics of the users' mobile communications terminals (which may affect the type and format of the supported media, the display size, the available processing resources, such as the available storage memory, and several other parameters), the characteristics of the communications link (by way of example, a UMTS link has in general a higher bandwidth than an EDGE link, which in turn has in general a higher bandwidth than a GPRS link), the quality of service class, the users' preferences (e.g., "no video files"), which may for example be included in a user's profile database 113 (containing user's preferences expressed by the user upon subscribing to the multimedia contents delivery service). To perform such an adaptation, the application server 110 relies on a transcoding platform 125.

Roughly speaking, when the application server 110 receives from a user's communications terminal 100 a request for multimedia contents (the user should normally register in advance to the service), the application server contacts the content provider(s) to retrieve the desired multimedia contents and sends the retrieved contents to the transcoding platform 125, or, alternatively, the application server simply sends to the transcoding platform 125 one or more links (e.g., IP addresses, URLs) to the multimedia contents to be retrieved. It is observed that providing to the transcoding platform simply the link(s) to the multimedia contents to be transcoded may be in some cases preferable, because any possible transfer of attachments within the interface protocols is thus avoided. The transcoding platform 125 transform the original multimedia contents (received from the application server or directly retrieved from the content provider) so as to adapt them to the delivery to that specific user, and then sends back the transcoded multimedia contents to the application server 110, which finally delivers them to the requesting user at his/her communications terminal 100.

Figure 1B:
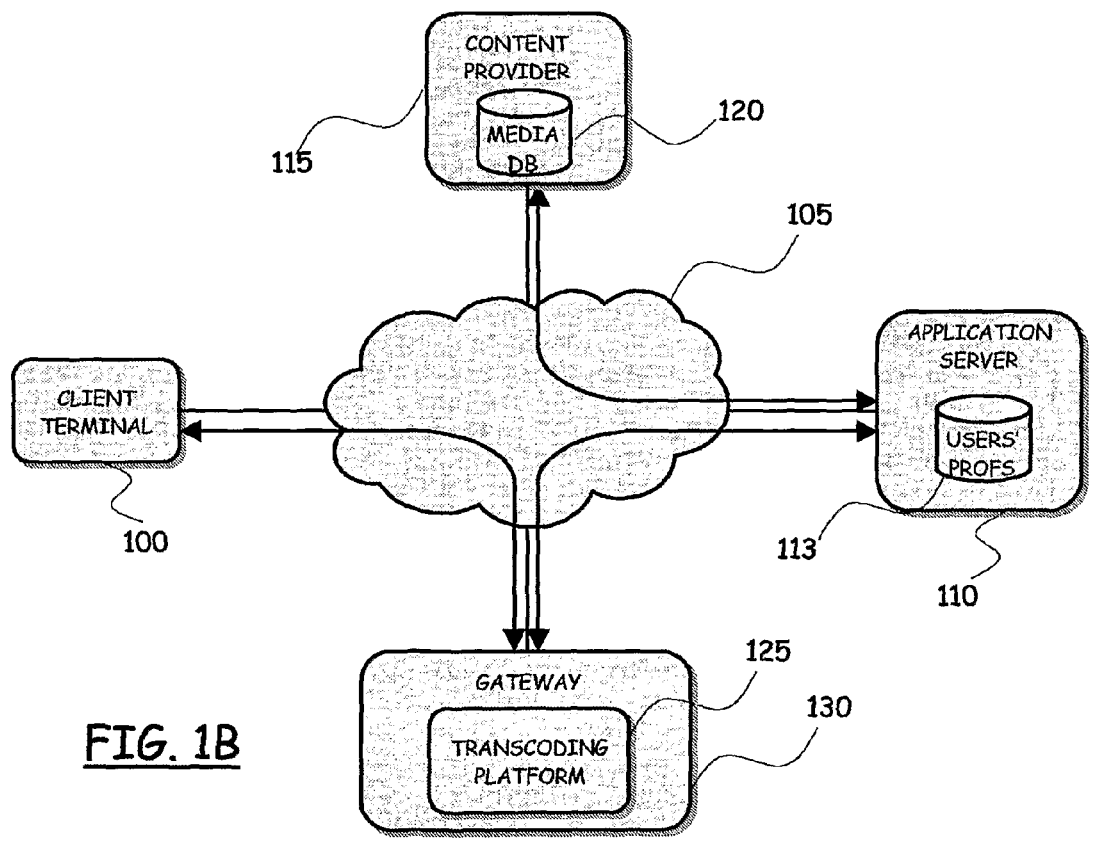
FIG. 1B schematically shows another exemplary scenario, slightly different from that of FIG. 1A, in which the present invention is applicable.

A possible second, slightly different scenario wherein the present invention can be applicable is depicted in FIG. 1B. In this case, the transcoding platform is included in a gateway 130 that is interposed between the user's communications terminal 105 and the application server 110, and that can be considered to act as a proxy between the users' terminals and the application server 110. For example, in the case of a WAP (Wireless Application Protocol) based service, the gateway 130 may be the WAP gateway. In this scenario, the user's request is received at the gateway 130, which forwards the request to the application server 110; as in the previous case, the application server 110 contacts the content provider(s) to retrieve the desired multimedia contents, then sends the retrieved contents to the gateway 130. The gateway 130, exploiting the transcoding platform 125, transforms the original multimedia contents (received from the application server) so as to adapt them to the delivery to that specific user, and then delivers the transcoded multimedia contents to the requesting user at his/her communications terminal 100.

The differences between the two scenarios depicted in FIGS. 1A and 1B are minimal, therefore in the following description reference will be made for simplicity to the first scenario, depicted in FIG. 1A.

FIG. 2 shows in greater detail, in terms of the main functional blocks, the transcoding platform 125, according to an embodiment of the present invention.

Acquisition modules 200 are dedicated to acquire, from a transcoding request 205 issued by the application server 110, input parameters 210 necessary to the transcoding platform 125 for carrying out the transcoding process.

The acquisition modules 200 are in particular adapted to acquire, possibly by means of estimation processes, parameters concerning the characteristics of the communications network link exploited by the user's communications terminal (e.g. a link bandwidth, admissible delay), the characteristics of the communications terminal 100, e.g. the communications terminal capabilities (for example in terms of a list of compression formats supported by the communications terminal, for each type of media: such information may for example be stored in the application server 110, or in another server, in the form of an XML (eXtensible Markup Language) file containing for example the media format supported by the different types of terminals, the display sizes, and the like), the service class (e.g., real-time delivery, non real-time delivery), user's preferences, e.g., retrieved from the users' profiles database 113, or expressly stated by the user upon requesting the service (for example, a preference stating "no videos"). The transcoding request 205 may further include one or more link (e.g. IP addresses) to the multimedia contents to be transcoded (alternatively, the transcoding request may include the already retrieved multimedia contents).

It is pointed out that although in FIG. 2 the acquisition modules 200 are depicted as internal to the transcoding platform 125, acting as an input interface towards the application server 110, this is not to be construed imitatively: the acquisition modules may as well be part of the application server 110, and act as an output interface thereof towards the transcoding platform. ID any case, the specific nature of the acquisition modules 200 is not critical to the present invention.

The input parameters 210 are sent to a transcoding engine 215, representing the engine of the transcoding platform 125, which organizes the activities to be performed for servicing a transcoding request. In particular, the transcoding engine 215 manages the transcoding platform interfaces towards external entities, such as the application server 110, for receiving the transcoding request 205 therefrom and delivering the transcoded multimedia contents 240 thereto, and the content provider(s) 115, for retrieving the multimedia contents to be transcoded by using the links provided by the application server 110.

The transcoding engine 215 interacts with a transcoding server 220 (a data processing hardware plus software tools), which is the resource responsible of practically executing the transcoding. The transcoding platform 125 may include more than one, e.g. two or more transcoding servers, in order to be capable to perform concurrently several transcoding operations; in this case, a load balancing policy may be adopted, for balancing the workload on the different transcoding servers (e.g., if one of the transcoding servers is busy, the transcoding platform may exploit another transcoding server for servicing another transcoding request). In particular, the transcoding server 220 receives from the transcoding engine 215 the multimedia contents to be transcoded.

The transcoding platform 125 further includes a transcoding policies module 225; the transcoding engine 215 interacts with the transcoding policies module 225 to establish a transcoding policy in respect of a transcoding request to be serviced, and passes the information to the transcoding server 220, which will thus perform the transcoding operation according to that specific policy. The transcoding policy determines in particular the sequence of operations to be carried out by the transcoding server for transcoding the multimedia contents. It is observed that although depicted as a separate entity, the transcoding policies module may be considered part of the transcoding server.

According to an embodiment of the present invention, the transcoding platform 125 further includes a transcoding response profiles database 230, storing historical, statistical information relating to the transcoding requests of multimedia contents previously service by the transcoding platform, as will described in greater detail later on. The transcoding response profiles database 230 is exploited by the transcoding policies module 225 for determining the better transcoding policy for each specific transcoding request. Additionally, the transcoding response profiles database 230 is kept updated by the transcoding engine 215.

A storage area, identified as transcoded cache 235 in the drawing, is further provided in or for the transcoding platform 125, used as a repository wherein the more frequently requested (transcoded) multimedia contents are stored, so as to speed up their delivery and reduce the workload of the transcoding server (which needs not perform again the transcoding of the multimedia contents, if the latter are already present, in transcoded form, in the cache 235). The provision of the transcoded cache is especially useful in case same multimedia contents are to be delivered to several users (as is for example the case of a "content-to-person MMS", wherein a content provider sends a same MMS to a list of users). In particular, the responsibility of managing the transcoded cache 235 may be up to the transcoding engine 215, which can exploit one of the methods known in the art for managing cache memories.

Figure 3:
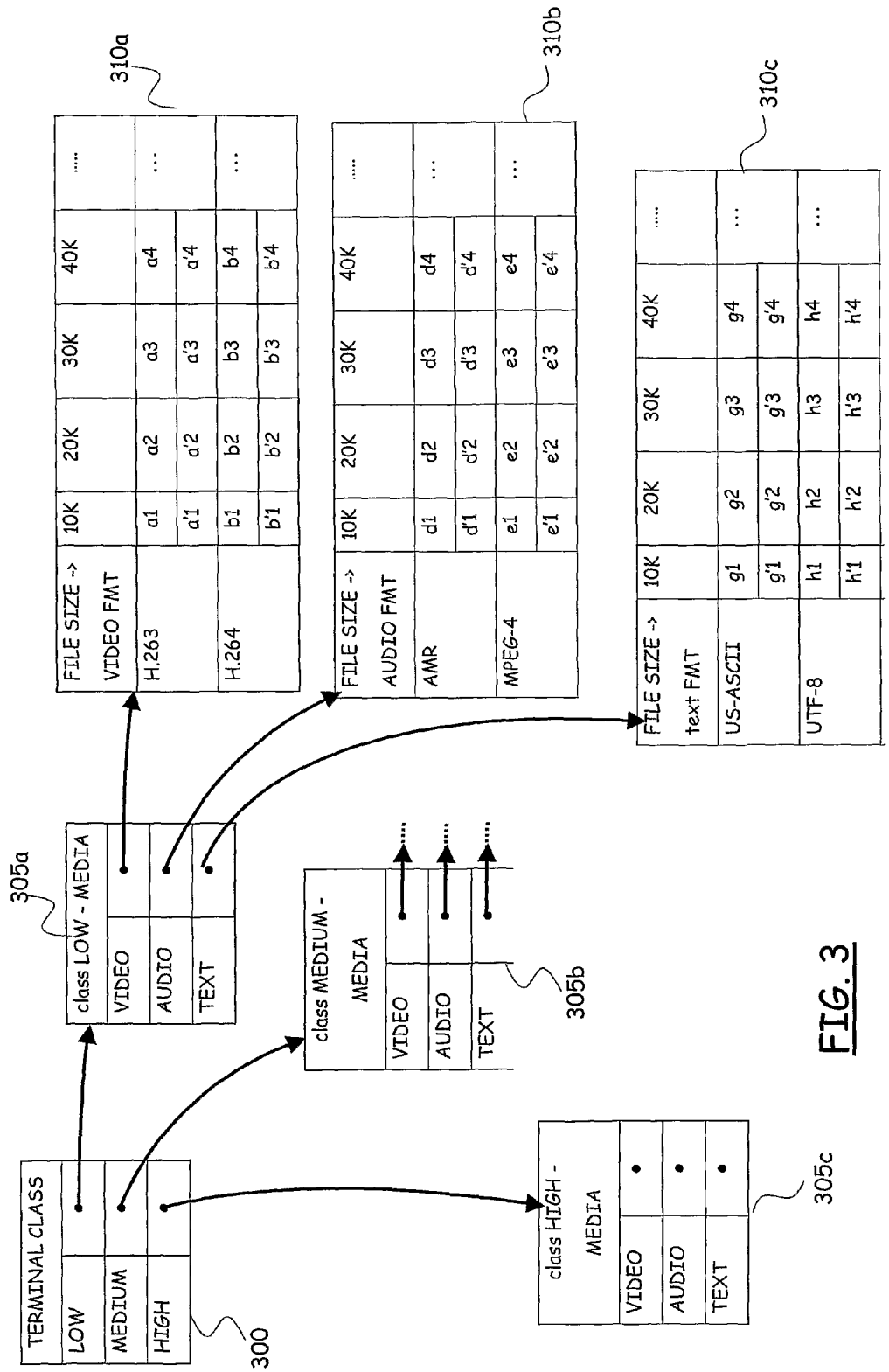
FIG. 3 pictorially shows a portion of a transcoding response profiles database of the transcoding platform, according to an embodiment of the present invention.

An exemplary, non limitative structure for the transcoding response profiles database 230 will be now described in detail with the help of the pictorial representation (of a small database portion) given in FIG. 3.

The transcoding response profiles database 230 may be structured as a relational database, i,e., a database based on the relational model, with a tabular structure that is addressable exploiting the input parameters 210 derived from the transcoding request 205, and the type/format of the target media. In particular, and merely by way of example, the input parameters that may be used for addressing the database are the users profiles class, the users' terminals class, the network link class, the service class, whereas the type/format of the target media may be video/H.263, video/H.264, audio/AMR, audio/MPEG-4, text/US-ASCII, text/UTF-8, and the like, wherein the acronyms identify well-known standard formats. More particularly, in order to keep the database of reasonable size and for facilitating the addressability thereof, the input parameters are preferably "clusterized": for example, discrete numbers of clusters of users profiles classes, users' terminals classes, network link classes ("low", "medium", "high", . . . ) and service classes ("non real-time", "medium interactive", "high interactive" and the like) are defined.

The input parameters' clusterization (i.e., the assignment of the generic input parameter to the proper cluster) may for example be performed by the acquisition modules 200, so the transcoding engine 215 receives indications of the clusters.

It is pointed out that the input parameters' clusterization is not established once and for all, i.e., the number of clusters is not invariable, because quantization techniques of the input parameters may be adopted that allow modifying the clusters' schema (by modifying/deleting existing clusters and adding new ones), so to track, for example, the changes in users' terminals types, services, and so on.

Referring to FIG. 3, a table 300 includes three exemplary clusters ("LOW", "MEDIUM", "HIGH") of user's terminal classes, and, associated to each cluster, a pointer points to a respective table 305a (cluster "LOW"), 305b (cluster "MEDIUM"), 305c (cluster "HIGH"), wherein media supported by terminals belonging to said terminal class cluster are listed. Considering for simplicity the table 305a (totally similar reasoning holds true for the other tables), let it be assumed that the terminals belonging to the class cluster "LOW" supports video, audio, and text media. For each media supported, a pointer is provided pointing to a respective table (table 310a for the media "VIDEO", table 310b for the media "AUDIO", table 310c for the media "TEXT"), wherein media formats are listed, with associated media file sizes, and historical information stored in respect of each possible combination of media format and file size. In particular, and by way of example, the table 310a for the "VIDEO" media lists as supported formats the H.263 and the H.264, and, for each of the two formats, a respective vector of numbers {a1,a2,a3,a4, . . . }, {b1,b2,b3,b4, . . . }, each element of the vector corresponding to a specific file (clusterized) size (e.g., 10 KB, 20 KB, 30 KB, 40 KB, . . . ) being a counter that identifies how many times, in the transcoding platform history, transcoded multimedia contents included a video file with that specific file size. Similarly, the table 310b for the "AUDIO" media lists as supported formats the AMR and the MPEG-4, and, for each of the two formats, a respective vector of numbers {d1,d2,d3,d4, . . . }, {e1,e2,e3,e4, . . . }, each element of the vector corresponding to a specific file size (cluster) (e.g., 10 KB, 20 KB, 30 KB, 40 KB, . . . ) and being a counter that identifies how many times, in the transcoding platform history, transcoded multimedia contents included such an audio file with that specific file size. And again, the table 310c for the "TEXT" media lists as supported formats the US-ASCII and the ULT-8, and, for each of the two formats, a respective vector of numbers {g1,g2,g3,g4, . . . }, {h1,h2,h3,h4, . . . }, each element of the vector corresponding to a specific file size (cluster) (e.g., 10 KB, 20 KB, 30 KB, 40 KB, . . . ) and being a counter that identifies how many times, in the transcoding platform history, transcoded multimedia contents included a text file with that specific file size.

In addition to the vectors of counters, the generic database table, like the tables 310a, 310b and 310c may include, for each specific media format, a second vector of numbers {a'1, a'2,a'3,a'4, . . . }, {b'1,b'2,b'3,b'4, . . . }, indicating weight factors for each file size; the weight factors can for example be derived from the corresponding counters, by means of a proper normalization, for example using functions related to the cumulative distribution or to the probability density of a variable indicating the size of the transcoded media file, probability that is indicated by the counters.

Figure 4:
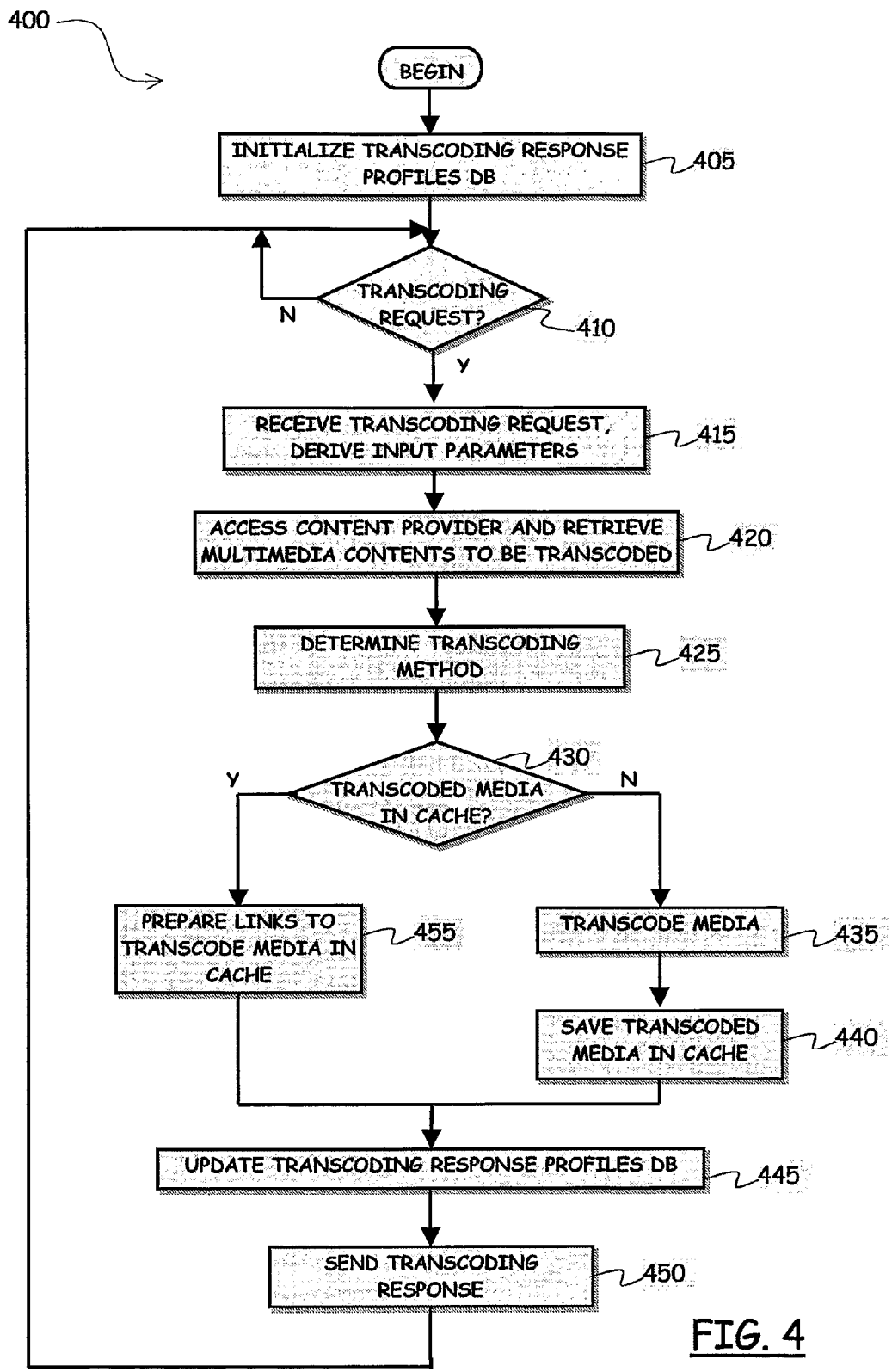
FIG. 4 is a schematic flowchart showing the main steps of a transcoding method according to an embodiment of the present invention.

It is observed that the transcoding response profiles database 230 may include additional information, e.g. statistics about different parameters exploited to determine the transcoding policy, such as, in the case of an image media, the number of bits/pixel, the size of the image in pixels, and the like The operation of the transcoding platform 125 will be now described with the help of the simplified flowchart 400 of FIG. 4.

Firstly, the transcoding response profiles database 230 needs to be initialized (block 405), by setting initial values for the counters and the corresponding weight factors. The database initialization can be carried out by setting a predefined distribution of counters (and, consequently, of the weight factors) in the database's tables; for example, a counters initialization that corresponds to a distribution of weight factors linearly increasing with the size (in KB) of the transcoded media files may be adopted.

The transcoding platform 125 then waits for transcoding requests (decision block 410). When the transcoding platform detects an incoming transcoding request (exit branch Y of decision block 410), the transcoding request is received, and the acquisition modules 200 derive the input parameters (block 415). In particular, the transcoding request may take the form of a file, e.g. an XML file which is provided by the application server 110. The input parameters derived from the transcoding request can include the link(s) to the multimedia contents to be transcoded, and other parameters identifying for example the communications network link exploited by the user's communications terminal, the capabilities (i.e., the class) of the communications terminal, the service class, user's preferences, already "clusterized" in accordance with the classification adopted in the database 230 (e.g., the input parameter specifying the communications terminal class will be LOW, MEDIUM, OR HIGH).

On the basis of the link(s) to the multimedia contents derived from the transcoding request, the transcoding engine 215 accesses the content provider 115 and retrieves the multimedia contents to be transcoded (block 420). In the database of the content provider 130, the multimedia contents may have associated therewith information (represented by descriptors) that allows an optimization of the transcoding operation, e.g., a descriptor associated with an image file stored in the media database 120 may specify geometric coordinates of the logic image center, to be exploited in the case the transcoding operation involves an image cut. Such additional information, encoded for example according to the MPEG-7 standard, is retrieved together with the media contents, and can be exploited by the transcoding platform 125 for better performing the transcoding process.

On the basis of the input parameters derived from the transcoding request, the transcoding engine 215 establishes the constraints of the transcoding operation to be performed. Once the contents to be transcoded have been retrieved, the transcoding engine 215 invokes the transcoding policies module 225 for determining the better transcoding method for transcoding those contents satisfying the constraints (block 425).

In order to accomplish this task, the transcoding policies module exploits the information stored in the transcoding response profiles database 230. In particular, the problem of determining the better transcoding method given the contents to be transcoded and the constraints corresponds to solving a multi-dimensional optimization problem, where the dimensions correspond to the different constraints to be respected.

Generally speaking, solving the optimization problem may consist in finding a transcoding method that substantially maximizes the quality of the multimedia contents delivery service while satisfying the constraints. For example, in the case of the delivery of an MMS comprising a video, an audio and a text contents, the solution of the optimization problem may correspond to maximizing the quality of the (transcoded) MMS message as perceived by the MMS destination user, while respecting the constraints, which can for example be expressed in terms of maximum MMS message overall file size (in KBs), as a result of, for example, general limitations of the delivery service and/or limitations of the capabilities of the user's communications terminal (e.g., available memory).

The optimization problem may thus be reformulated as a resource allocation problem: denoted by $Q_i$ and $R_i$ a quality index and the resources that can be allotted for the $i^{th}$ media (video, audio, text), and being $R_{max}$ the maximum available (overall) resources, the problem to be solved is:

$$\max (\Sigma_i Q_i) \text{ such that } \Sigma_i R_i \leq R_{max}$$

In an embodiment of the present invention, the transcoding policies module 225 exploits a dynamic programming algorithm for solving the multi-dimensional optimization problem. Dynamic programming algorithms are known in the art to be useful in determining solutions to optimization problems. One such algorithm is for example the so-called "knapsack" (described for example at the URL: http://www-cse.uta.edu/~holder/courses/cse2320/lectures/applets/knapsack/knapsack.html); this is however not limitative to the present invention.

Hereinbelow, a relatively simple but clarifying example is provided of how the transcoding policies module operates for determining the transcoding method.

Let it be assumed that the transcoding policies module 225 accesses the database 230 using as access keys the inputs parameters specifying the user terminal class, that the user's terminal class falls in the cluster "LOW" (table 300 in FIG. 3), and that the constraint derived from the transcoding request sets a maximum overall file size equal to, e.g., 150 KB. Let it also be assumed that the original MMS message retrieved from the content provider 115 includes a video file in H.264 format, an audio file in AMR format and a text file in US-ASCII format.

Looking at the tables 310a, 310b and 310c, the transcoding policies module 225 establishes that all the above media formats are supported by that class ("LOW") of users' terminals. The transcoding policies module 225 then checks whether the original MMS message satisfies the maximum file size constraint: in the affirmative case, no transcoding is actually necessary, and the MMS message can be delivered to the user's terminal as such; otherwise, the transcoding policies module 225 firstly tries to find out a transcoding method that allows compressing the file size while retaining the original media formats (H.264, AMR, US-ASCII). Based on the weight factors in the tables 310a, 310b and 310c (which depends on the past history of the transcoding platform 125), a table like the following one can extrapolated:

|  | 10 KB | 20 KB | 30 KB | 40 KB | 50 KB | 60 KB | 70 KB | 80 KB | 90 KB | 100 KB | 300 KB |
|---|---|---|---|---|---|---|---|---|---|---|---|
| Video (H.264) | 0 | 0 | 3 | 10 | 20 | 40 | 60 | 75 | 85 | 98 | 100 |
| Audio (AMR) | 5 | 20 | 40 | 60 | 80 | 95 | 98 | 99.7 | 99.8 | 99.9 | 100 |
| Text (US-ASCII) | 50 | 70 | 90 | 99.3 | 99.4 | 99.5 | 99.6 | 99.7 | 99.8 | 99.9 | 100 | wherein the first row specifies file size classes (10 KB, 20 KB, and so on, up to 300 KB), and the remaining three rows contains, one for each of the three media (with specified formats) making up the MMS message, vectors of weight factors associated with combinations of that media/format and file sizes.

The problem to be solved by the transcoding policies module 225 for determining if the there exist a transcoding method that allows compressing the file size while retaining the original media formats consists in finding if possible a combination of the file sizes for the three media that, while not exceeding the overall file size constraint of 150 KB, maximizes the sum of the associated weight factors.

It is observed that, in the exemplary embodiment herein described, the weight factors in the above table may be construed as representing the quality of service perceived by the users depending on the media file size (and thus on the level of media compression); thus, the generic weight factor may correspond to an index of quality. Looking at the exemplary weight factors table above, it can be noted that for the video media the weight factor, and thus the quality index, increases gradually with the file size, whereas for the audio and text media saturation is reached at approximately 80 KB and 40 KB, respectively. As described in the foregoing, the weight factors are derived from corresponding counters, which in turn provide historical information on the past history of the transcoding platform; thus, looking again at the exemplary table reported in the foregoing, it may be interpreted as meaning that the transcoding platform 125, in the past, has produced very few audio files with size greater than 80 KB, and very few text files with size greater than 40 KB. Using the weight factors in the dynamic programming algorithm for solving the optimization/resource allocation problem thus means taking into account the previous history of the transcoding platform, expressed in particular in terms of the counters.

If the transcoding policies module is able to solve the above problem, determining the best file sizes for the three media (in their original format), that solution will define the transcoding policy to be adopted in the specific case. In the negative case, the transcoding policies module retries by choosing other media formats (for example, the transcoding policies module will try to solve the above optimization problem using the format MPEG-4 for the audio media). If no solution can be found, a down-scaling is finally attempted, for example, the original video is replaced by a single frame thereof (a still image), and/or the original audio is replaced by an icon, and/or the original text string is replaced by a shorter one, for example the mere title.

Once the transcoding policies module 225 has determined the best transcoding method for the instant multimedia contents request, and has communicated the result to the transcoding engine 215, the transcoding engine 215 looks in the transcoded media cache 235 so as to ascertain whether a similar transcoding request (same multimedia contents, same transcoding method) has already been received and services in the past, and thus whether the transcoded contents are already present in the cache (decision block 430). For an efficient use of the transcoded media cache 235, every transcoded media may be assigned a univocal identifier and an associated descriptor. It is observed that in order to properly address the cache 235, same or similar information exploited for building and keeping updated the transcoding response profiles database can be used. In particular, in order to ascertain whether a multimedia content is already present, in transcoded form, in the cache 235, it shall be established whether one or more files with desired characteristics are present in the cache; for example, in the case of an image file, it should be ascertained whether the file name, the encoding format, the image dimensions (e.g., in pixels), the file size (e.g., in KB) and the like coincides with those desired. The descriptor associated with the generic transcoded content in the cache may be an XML file (the same syntax as that exploitable for the descriptor of the original content in the content provider database).

In the negative case (exit branch N of decision block 430), the transcoding engine 215 issues a transcoding request to the transcoding server 220, which performs the transcoding operation according to the method previously established by the transcoding policies module (block 435).

The transcoding engine 215 assigns to the newly transcoded multimedia contents a univocal identifier and associates thereto a descriptor, and stores them in the transcoded media cache 235 (block 440).

The transcoding engine 215 then updates the transcoding response profiles database 230 (block 445). In particular, the transcoding engine 215 extracts from the transcoded multimedia contents the information necessary for updating the statistics in the database. For example, the transcoding engine accesses the database (in a way similar to that followed by the transcoding policies module 225 in the previous step) and gets to the tables 310$a$, 310$b$ or 310$c$, wherein one or more of the counters are increased; as a consequence, also the weight factors distributions are updated. In this way, the statistics in the database take into account the newly performed transcoding operation.

Then, the transcoding engine 215 replies to the initial transcoding request (block 450). In particular, an XML file is prepared that includes the transcoded media contents, or links to the copies thereof in the cache 235, and the file is sent to the application server 110.

The operation flow jumps back to block 410, and the transcoding platform waits for new transcoding requests to be processed.

Back to the decision block 430, if the transcoded media are already present in the cache 235 (exit branch Y), the transcoding engine prepares the link(s) to the transcoded media in the cache, that will have to be included in the reply to the application server 110 (block 455), then, as in the former case, the transcoded response profiles database 230 is updated (block 445), and the reply to the application server 110 is sent (block 450).

Thus, according to an embodiment of the present invention, the transcoding of multimedia contents is carried on using transcoding policies that are not static, rather they are adaptive and, in particular, based on statistical information adapted to define the past history of the transcoding platform.

It is worth noting that the statistics may be improved by exploiting polling campaigns directed to check the users' satisfaction, or by carrying out trials adapted to determine, for the different communications terminals, the best supported media These data can be included in the statistics of the transcoding platform database giving to them a proper weight factor.

The transcoding platform may in the practice include a programmable data processing apparatus or a system of programmable data processing apparatuses loaded with and executing a software adapted to implement the above described method.

Additionally, one or more of the components of the transcoding platform, such as the transcoding engine and/or the transcoding server, may take the form of a web service (adopting standard XML, TTP and SOAP communications protocols), independent from the remaining platform components. Also, the transcoding platform as a whole may take the form of a web service, providing multimedia contents transcoding services to every client application. The transcoding platform may thus be rendered very open, with component modules that are independent from each other but interoperable.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for managing the delivery of multimedia contents to users' communications terminals over a communications network, comprising transcoding the multimedia contents to be delivered, said transcoding comprising:
- determining an adaptive transcoding method based on historical information of previous transcoding operations;
- performing a transcoding of the multimedia contents to be delivered according to the determined transcoding method to obtain transcoded multimedia contents to be delivered; and
- updating the historical information according to the performed transcoding of the multimedia contents to be delivered, wherein the historical information includes;
  - a plurality of counters each corresponding to one value of a plurality of values for a transcoding parameter and identifying a number of times the corresponding value has been previously used in performing transcoding,
  - a plurality of weight factors each corresponding to one value of the plurality of values for the transcoding parameter and being derived by normalizing the counter corresponding to the one value, and
  - a plurality of user perceived quality of service values each corresponding to one value of the plurality of values for the transcoding parameter and being represented by the weight factor corresponding to the one value.

2. The method according to claim 1, wherein said determining the adaptive transcoding method further comprises:
- extracting one or more of: information about users' communications terminal capabilities, information about communications network capabilities, and information about users' preferences from a multimedia contents request by a users' communications terminal; and
- determining at least one constraint for the transcoded multimedia contents to be delivered from said one or more information.

3. The method according to claim 2, wherein said determining the adaptive transcoding method comprises using the historical information for optimizing an allocation of resources taking into account the at least one constraint.

4. The method according to claim 3, wherein said optimizing the allocation of resources comprises exploiting dynamic programming techniques.

5. The method according to claim 1, wherein said historical information comprises a statistic frequency of a plurality of transcoded multimedia contents obtained as a result of previous transcoding operations.

6. The method according to claim 5, wherein said determining the adaptive transcoding method further comprises:
- identifying a list of transcoded multimedia contents typologies;
- classifying each of said transcoded multimedia contents obtained as a result of previous transcoding operations according to said identified list of transcoded multimedia contents typologies, said classifying affecting a statistic frequency of the transcoded multimedia contents typologies; and
- associating with each transcoded multimedia contents typology in said list a weight factor indicative of said statistic frequency.

7. The method according to claim 6, wherein said list of multimedia contents typologies comprises:
- a list of multimedia contents components;
- for each multimedia contents component, at least one multimedia contents component format; and
- for the at least one multimedia content component format, a list of transcoded multimedia content component size values.

8. The method according to claim 7, wherein said statistic frequency is representative, for each size value in each list of transcoded multimedia content component size values, of an indication of the number of times in the previous transcoding operations, a transcoded multimedia contents comprised of a multimedia contents component with that size value.

9. The method according to claim 1, further comprising:
- providing a repository of transcoded multimedia contents obtained as a result of previous transcoding operations, wherein said performing a transcoding of the multimedia contents to be delivered according to the determined adaptive transcoding method comprises:
  - ascertaining if the repository comprises a transcoded multimedia contents transcoded according to the determined adaptive transcoding method; and
  - in the affirmative case, delivering the transcoded multimedia contents in the repository; and
  - in the negative case, having the multimedia contents to be delivered transcoded using the determined adaptive method, and storing the transcoded multimedia contents in the repository.

10. A web service providing transcoding services in a TCP/IP network, and comprising adaptation to implement the determined adaptive transcoding method according to claim 1.

11. A non-transitory computer readable medium encoded with a computer program loadable into a memory of a data processing apparatus and comprising software for implementing the method according to claim 1.

12. The method of claim 1, wherein the transcoding parameter is a size of the multimedia contents.

13. The method of claim 1, wherein determining the adaptive transcoding method includes selecting, from a plurality of allowable values for the transcoding parameter, a maximal value which maximizes user perceived quality of service.

14. A transcoding platform for transcoding multimedia contents to be delivered to users' communications terminals over a communications network, comprising:
- a database for storing historical data indicative of previous transcoding operations performed by the transcoding platform;
- a transcoding method determination module for determining an adaptive transcoding method to be applied for transcoding the multimedia contents to be delivered based on said historical data;
- a transcoder module for transcoding the multimedia contents to be delivered based on the determined adaptive transcoding method, so as to obtain transcoded multimedia contents to be delivered, the transcoder module comprising data processing hardware plus software; and
- a historical data updating module for updating said historical data in said database according to the transcoding, wherein the historical information includes:
  - a plurality of counters each corresponding to one value of a plurality of values for a transcoding parameter and identifying a number of times the corresponding value has been previously used in performing transcoding,
  - a plurality of weight factors each corresponding to one value of the plurality of values for the transcoding parameter and being derived by normalizing the counter corresponding to the one value, and
  - a plurality of user perceived quality of service values each corresponding to one value of the plurality of values for the transcoding parameter and being represented by the weight factor corresponding to the one value.

15. The transcoding platform according to claim 14, wherein said transcoding method determination module comprises an adaptation to:
- extract one or more of: information about users' communications terminal capabilities, information about communications network capabilities, and information about users' preferences from a multimedia contents request by a users' communications terminal; and
- determine at least one constraint for the transcoded multimedia contents to be delivered from said one or more information.

16. The transcoding platform according to claim 15, wherein said transcoding method determination module is adapted to use the historical data in said database for optimizing an allocation of resources taking into account the at least one constraint.

17. The transcoding platform according to claim 16, wherein said transcoding method determination module is adapted to exploit dynamic programming techniques.

18. The transcoding platform according to claim 14, wherein said historical data in said database comprise a statistic frequency of a plurality of transcoded multimedia contents obtained as a result of previous transcoding operations.

19. The transcoding platform according to claim 18, wherein said historical data in said database comprise:
- a list of transcoded multimedia contents typologies;
- a classification of each of said transcoded multimedia contents obtained as a result of previous transcoding operations according to said identified list of transcoded multimedia contents typologies, said classification determining a statistic frequency of the transcoded multimedia contents typologies; and
- associated with each transcoded multimedia contents typology in said list, a weight factor indicative of said statistic frequency.

20. The transcoding platform according to claim 19, wherein said list of transcoded multimedia contents typologies comprises:
- a list of transcoded multimedia contents components;
- for each transcoded multimedia contents component, at least one multimedia contents component format; and
- for the at least one transcoded multimedia content component format, a list of transcoded multimedia content component size values.

21. The transcoding platform according to claim 20, wherein said statistic frequency is representative, for each size value in each list of transcoded multimedia content component size values, of an indication of the number of times in the previous transcoding operations, a transcoded multimedia contents comprises a multimedia contents component with that size value.

22. The transcoding platform according to claim 14, further comprising a repository of transcoded multimedia contents obtained as a result of previous transcoding operations, wherein said transcoding method determination module comprises further adaptation for:
- ascertaining if the repository comprises a transcoded multimedia contents transcoded according to the determined adaptive transcoding method; and
- in the affirmative case, delivering the transcoded multimedia contents in the repository; and
- in the negative case, having the multimedia contents to be delivered transcoded using the determined adaptive transcoding method and storing the transcoded multimedia contents in the repository.

23. The transcoding platform of claim 14, wherein the transcoding parameter is a size of the multimedia contents.

24. The transcoding platform of claim 14, wherein determining the adaptive transcoding method includes selecting, from a plurality of allowable values for the transcoding parameter, a maximal value which maximizes user perceived quality of service.

* * * * *